Patented Mar. 11, 1952

UNITED STATES PATENT OFFICE 2,589,037

PRESERVATION OF GREEN COLOR IN CANNED VEGETABLES

Gordon H. Bendix and Robert E. Henry, Park Ridge, and Norman H. Strodtz, Eola, Ill., assignors to Continental Can Company, Inc., New York, N. Y., a corporation of New York No Drawing. Application March 23, 1951, Serial No. 217,286

7 Claims. (Cl. 99—186)

The following specification refers to our invention in the preservation of green color in canned vegetables. Fresh green vegetables intended to be preserved in cans, undergo a series of operations which frequently impair the natural green color, thus rendering the products less desirable. It is well recognized that the natural color in fresh green vegetables is due to the presence of chlorophyll. This is a complex organic compound containing magnesium in non-ionic form. The chlorophyll may be in part decomposed by the routine processing of the vegetables or by the subsequent storage. Treatment of the vegetables with alkaline substances tends to preserve the chlorophyll, but only at the expense of the texture and palatability of the material.

Vegetables, when freshly harvested, are naturally acid, having a pH less than 7, ranging, as in the case of asparagus, from 5.2 to 5.4 to that of peas with a pH of 6 to 6.5. However, there is an inherent tendency during the present commercial canning operations, especially that of heating the product in the container for preservation, for the product to become slightly more acid. For example, peas having an initial pH of 6.2 when fresh may have a pH of 5.9 after processing, with subsequent slight decrease during storage. However, the natural buffer capacity of the product is such that no great change in pH is allowed to take place, although some acid products may be produced during storage in accordance with the length of time the product is in storage. This change in pH or natural tendency to develop acidity works a partial destruction of the chlorophyll; therefore, any chlorophyll protective means such as alkalinity must persist for a considerable time after processing and become available as a reserve or buffer to counteract any increasing acidty.

It is an object of our invention to control the alkalinity of green vegetables such as green peas, spinach, asparagus and the like during processing and subsequent storage for the purpose of preserving the natural green color.

It is a further object to protect the natural chlorophyll of the vegetables from decomposition during processing and storage.

A still further object of the invention is to eliminate the necessity of supplying alkali to the raw material prior to blanching and filling into the cans or other containers.

Among the objects of our invention is to make use of an alkalizing and texturing agent, acceptable under established standards and compatible with the nature of the final product.

Further, the agent used is one which, as it reacts, leaves no trace of undesirable matter, but on the contrary supplements the salt-sugar brine customarily used in packing green vegetables.

Other objects of the invention follow from the following description of the nature and particulars of our process as described in the preferred mode of its application.

Many plans have been proposed for maintaining an alkaline condition equal to or greater than the original pH. The increase of alkalinity by soaking or blanching is subject to certain disadvantages. If the alkali is from a sodium compound, the texture of the vegetable may be softened to the point where it is classed as "mushy." On the other hand, if a calcium compound supplies the alkalinity, the skin of the vegetable is rendered too firm or tough. The addition of magnesium to the final brine has been proposed. However, the unregulated addition of magnesium as the alkaline agent is likewise subject to objection, as it may produce glass-like crystals of struvite, (magnesium ammonium phosphate) the presence of which will be objectionable to the consumer.

This, also, overlooks the fact that where the chlorophyll molecule has already lost magnesium as a result of a base exchange with a stronger alkali, the reaction is not reversible. In other words, the addition of magnesium will not restore or re-constitute the chlorophyll molecule once it has been decomposed.

The problem previously has been considered as one in which the final canning operation may serve to restore alkali which has been removed in the course of the preliminary soaking, washing or blanching steps, and to supply a reserve of any suitable alkali to counteract the inherent tendency toward increase in acidity.

Our invention has been addressed to providing an alkalizing and texturing agent in the final step, so that there shall be a reserve available to counteract the acidifying influences that may ensue. In that respect, our process may be considered briefly as involving a direct addition to the material at the point of actual canning in contrast to the known processes by which the vegetables are first subjected to alkaline soaking and later washed, blanched and canned.

Specifically, our invention consists in the addition of an alkalizing and texturing agent to the final brine in which the green vegetables are packed and sealed in cans. Procedure in this manner eliminates the use of chemicals in the preliminary soaking and blanching steps. A further feature of the novel process is in holding the canned vegetables for a limited period, customarily not less than 15 minutes, in order to establish a desirable state of equilibrium prior to sterilizing the filled cans.

While the process is adapted for numerous green vegetables such as peas, spinach, asparagus and the like, it will be described here in particular detail as applied to green peas. It is best fitted for tender, sweet green peas, although it works nearly as well with large, mature peas which may have lost some of the original coloring.

Additionally, we make use of a texturing agent which is compatible with the salts normally present in fresh vegetables. This agent when consumed in neutralizing inherent acidity of the product, will leave no trace inconsistent with the standard and approved requirements for canned products of this type.

Specifically, we make use of an alkaline calcium sucrate solution to be added after the vegetable has been blanched and filled into the cans. This agent contains nothing not acceptable and approved for addition to foodstuffs. It is well known practice to add sugar in the final brine. It is likewise standard practice to add a sodium compound as an alkaline agent in the soaking or blanching steps. Calcium and magnesium are well known replacements for sodium in the proportions generally used.

As has been mentioned, magnesium produces an ammonium phosphate salt which appears as the glass-like crystals of struvite. Calcium as the oxide or hydroxide, is difficult to maintain in solution and impairs its clarity.

The calcium sucrate complex molecule reduces the ionization of the calcium ion sufficiently to prevent the precipitation of calcium as the hydroxide in an alkaline solution, thus a substantially clear solution is formed with the texturizing agent, calcium, in solution in the presence of sufficient alkali to maintain the desired alkalinity and overcome the inherent acidity of the product. Moreover, as the sucrate is consumed for this purpose, it adds a small amount of sucrose to that which is already present in the final brine.

It is desirable at this point to outline the typical formulation and production of the calcium sucrate-alkaline, salt-sugar brine. This, substantially, is regular or commercial salt-sugar brine that is normally used in the brining of canned peas, with the addition of the alkali-calcium sucrate mixture. A definite procedure must be followed in the preparation of the final brine in order to produce a clear or substantially clear calcium-containing alkaline brine. The recommended procedure is as follows in the order of the itemized steps:

1. Heat water, adjusting level so final volume will be 150 gallons.
2. Add 150 ml. of concentrated hydrochloric acid and boil vigorously for 5 minutes.
3. Add sodium hydroxide (dry) in small portions.

*Caution!*—The quantity of sodium hydroxide to be added is calculated as described elsewhere.

4. Add 25 pounds of sugar (sucrose) to 150 gal. volume and stir for complete solution and distribution.
5. Withdraw approximately 2 gallons of the hot solution and dissolve therein 12.5 pounds of sugar.
6. Add also to the portion in 5, 1-pound 15-oz. dry calcium chloride and dissolve.
7. While stirring, pour back calcium chloride bearing solution into remainder of brine (150-gal. vol.).
8. Add twenty pounds of salt and mix.
9. The final volume should be 150 gallons.

In the case of green peas, the raw product should be fancy or extra standard grade.

The raw, washed peas are blanched in hot water for the minimum time necessary to expel occluded gases and extraneous adhering materials.

We have found in actual practice that blanching for a two-minute period while maintaining a temperature of 200° F. does not cause an appreciable loss of chlorophyll and still provides sufficient time and temperature for an adequate blanch. After blanching, the peas are cooled immediately by submersion in cold water. The blanched product is then drained so as to be substantially free from adhering water and filled into cans by the use of conventional type of canning equipment. A definite amount of sugar-salt brine, either hot or cold, containing calcium sucrate and alkali in the proper concentration to produce a pH of 8.0–8.5 in the product immediately after processing, is added, and the cans allowed to stand in air at room temperature or in cold water for approximately 15 minutes, in order to partially neutralize the acid constituents which are normally present in peas and thereby reduce the alkalinity of the brine which surrounds the peas. The latter condition is desirable because chlorophyll may undergo decomposition and loss of green color at the elevated temperature of the processing retort under conditions of high alkalinity. The holding or standing time may vary from 15 min. to 60 min. and may occur before or after the cans are closed. The cans are then placed in the retort for sterilization by heat. No. 10 cans should be processed for approximately 11 minutes at 260° F. and pressure cooled immediately to 100° F. This is on the assumption that the come-up time is not less than 4 minutes. The processed cans are placed in cool storage (40° to 55° F.) as soon as possible after processing. The amount of calcium ion, the skin texturizing agent, to be added is influenced to some extent by the amount of sodium ion present in the brine. The significant source of this ion is the salt which is added rather than the sodium hydroxide. Since the amount of salt (sodium chloride) added in the brine is ordinarily a fixed amount, usually between 1 and 2 per cent, dependent upon the judgment of the canner, the amount of calcium ion added to the brine, in the form of calcium chloride, to cause firming of the pea skins depends again upon the judgment of the canner. Complete absence of a calcium salt in the alkaline brine will result in a mushy or soft product which is undesirable. However, we have found that 1 part of calcium chloride to 10 parts of sodium chloride to be a practical working ratio; however, this may be changed to 1 part of calcium chloride to 20 parts of sodium chloride and still produce a commercially acceptable product. However, the firmness of the peas required depends upon the judgment of the canner. The end use of the product influences the judgment of the canner. For example, if the peas are to be used in institutional feeding where they are held hot on a steam serving table for protracted periods, it is desirable that the peas have greater firmness than those which are used immediately after heating. The maturity of the incoming peas may also influence the final firmness of the peas. However, considering all the variables which may enter into the final firmness of the peas, the ratio of calcium chloride to sodium chloride to be used in the brine will usually be in the range of 1 part of calcium chloride to 10 or 20 parts of sodium chloride.

It has been found by experience that the peas should have a pH in the range of 8.2 to 8.5 immediately after processing, and a pH range of 8.0 to 8.3 twenty-four hours after processing and somewhat lower shortly thereafter. It has also been found by experience that without proper control of the amount of alkali added in the brine unsatisfactory variations of pH, and, consequently, unsatisfactory chlorophyll retention occurs. Experience has also taught that variations in the amount of acidic constituents in freshly harvested peas occur from batch to batch, as influenced by growing conditions and varietal differences. As a consequence, these variations must be overcome in order to produce a consistently satisfactory greenness and flavor in the final product. The control procedure developed, which we believe has novelty and which must be employed in our process in order to provide a consistently satisfactory final produce, is described specifically as follows:

Step 1. The time and temperature of blanch must first be established. The time-temperature relationship may be varied from time to time, but for best results it should remain constant, as for example, at 190° F. for 2 minutes.

Step 2. A representative sample of the blanched and cooled peas is taken. This batch of peas is held while the amount of alkali to be added to each can is calculated.

Step 3. Weigh out four samples of the blanched peas. For convenience, it is suggested that 5 ounces of peas be considered a sample. To each sample is added an equal weight of water.

Step 4. To the four samples 3, 5, 8 and 10 ml. of 0.5 normal sodium hydroxide are added respectively, i. e., to sample 1 add 3 ml. of 0.5 normal sodium hydroxide; to sample 2 add 5 ml. of 0.5 normal sodium hydroxide; to sample 3 add 5 ml. of 0.5 normal sodium hydroxide and to sample 4 add 5 ml. of 0.5 normal sodium hydroxide.

Step 5. The samples are then blended individually in a food blender such as a Waring blender for one minute.

Step 6. Measure pH of slurry after fifteen minutes' standing.

Step 7. Plot pH of slurry against amount of alkali added to each sample. The amount of alkali is expressed in terms of number of milliequivalents of sodium hydroxide per ounce of peas (1 ml. 0.5 normal sodium hydroxide per 5 oz. of peas=0.1 milli-equivalent per ounce of peas).

Step 8. Locate pH 8.7 on graph and read from the other ordinate of the graph the number of milliequivalents per ounce of peas.

Step 9. Determine the ounces of peas and amount of brine to be used in the specific size can to give the proper fill. In the instance of a number 10 can, a fill of 68 ounces of peas and 42 ounces of brine was found to be satisfactory and used to the greatest extent in our work.

Step 10. The amount of alkali to be used in making up 150 gal. of the alkali-salt-sugar-calcium sucrate brine is then calculated according to the following formula:

*Formula A.*—(oz. of peas per can) × (milliequivalents titrated+.04) =millieq. NaOH per can.

*Formula B.*—

$$1.85 \frac{\text{(milliequivalents NaOH per can)}}{\text{(oz. brine per can)}} =$$

pounds per 150 gal.

It will be noted that 0.4 is added to the milliequivalents necessary for each can as read from Step 8. This factor is used to aid in adjusting the calculations to partially compensate for the acidic constituents developed in the peas during processing.

The procedure thus followed and the results obtained maintain conditions most favorable to the preservation of the natural green color due to chlorophyll. The specimens examined after standing, not only have retained a pH high enough to preserve the chlorophyll, but give ocular proof that the color has been preserved.

It has also been observed that the flavor remains fresh and good. This is in direct contrast with the tendency of the product to develop a slightly bitter taste where magnesium oxide or other compound has been introduced for preservative purposes.

Specimens of peas treated in the manner indicated above do not develop strong or unpleasant odors.

Finally, the peas thus treated have an excellent texture. As has been indicated, the ratio of calcium to sodium is less than 1 to 20. The sodium need not be sufficient to soften the skins of the peas. Also, the quantity of calcium is not capable of giving an objectionable firmness or toughness to the skins. In fact, there is such a balance between the two elements, that the alkaline calcium sucrate may be properly considered a texturing agent.

At the pH range indicated, calcium sucrate remains in solution. Its utilization depends upon an inherent increase in acidity of the peas or other vegetables. The agent therefore is an excellent reserve against expectable acid changes during storage.

In carrying out this method it is evident that the packing operation may be greatly simplified. Fortifying or reinforcing the alkalinity by a preliminary alkaline soak, is eliminated.

As the texturing and alkalizing agent is applied during the can filling operation, the dosage can be set in advance. Loss of the agent is avoided, as its introduction is followed only by sealing and processing of the cans.

We have indicated above the preferred manner in which our invention can be carried out to attain the desired results. We may substitute potassium for sodium in the alkali used either for the sucrate solution or brine with corresponding adjustment of quantities. It will also be possible to vary the process in other minor respects as regards equivalent materials and proportions. Our invention, therefore, is to be limited only by the terms of the following claims.

What we claim is:

1. The process of preserving the color in canned green vegetables which consists in adding an alkaline calcium sucrate to the liquid in which the vegetables are preserved.

2. The process of preserving the color in canned green vegetables which consists in adding an alkaline calcium sucrate to the liquid in which the vegetables are to be processed, holding the vegetables in the liquid until equilibrium is established and thereafter sealing and sterilizing the containers with the vegetables.

3. The process of preserving the color in canned green vegetables which consists in adding a solution of calcium sucrate in dilute sodium hydroxide to the vegetables which are being canned, and thereafter sealing and sterilizing the filled cans.

4. The process of preserving the color in canned green vegetables which consists in adding an alkaline brine solution containing calcium sucrate to the vegetables which are being canned, filling the cans with a brine and thereafter sealing and sterilizing the filled cans.

5. The process of preserving the color in canned green vegetables which consists in adding a solution of calcium sucrate in dilute sodium hydroxide to the vegetables which are being canned, filling the cans with an alkaline salt-sugar brine and thereafter sealing and sterilizing the filled cans.

6. The process of preserving the color in canned green vegetables which consists in adding a solution of calcium sucrate in dilute sodium hydroxide to the vegetables which are being canned, filling the cans with a sodium hydroxide salt-sugar brine, the ratio of calcium to total sodium being not greater than one to twenty and thereafter sealing and sterilizing the filled cans.

7. The process of preserving the color in canned green peas, which consist in blanching the fresh peas, washing the peas, filling the peas in cans, adding a solution of calcium sucrate in dilute sodium hydroxide, filling the cans with a sodium hydroxide and salt-sugar brine to produce pH 8 to 8.2, and thereafter sealing and sterilizing the filled cans.

GORDON H. BENDIX.
ROBERT E. HENRY.
NORMAN H. STRODTZ.

No references cited.